United States Patent
Spiegel et al.

(10) Patent No.: US 9,405,836 B2
(45) Date of Patent: Aug. 2, 2016

(54) CONTINUOUS FLOW ULTRA-CENTRIFUGATION SYSTEMS

(75) Inventors: Kurt Spiegel, Bronx, NY (US); Sorin Weissman, West Caldwell, NJ (US); Bill Lepse, Vernon, NJ (US); Blaine J. Marsh, Columbia, NJ (US)

(73) Assignee: ALFA WASSERMANN, INC., West Caldwell, NJ (US)

( * ) Notice: Subject to any disclaimer, the term of this patent is extended or adjusted under 35 U.S.C. 154(b) by 1065 days.

(21) Appl. No.: 13/462,962

(22) Filed: May 3, 2012

(65) Prior Publication Data

US 2012/0220441 A1    Aug. 30, 2012

Related U.S. Application Data

(62) Division of application No. 12/338,836, filed on Dec. 18, 2008, now Pat. No. 8,099,430.

(60) Provisional application No. 61/008,902, filed on Dec. 21, 2007.

(51) Int. Cl.
   *B04B 7/02*    (2006.01)
   *B04B 9/12*    (2006.01)
   *B04B 13/00*   (2006.01)
   (Continued)

(52) U.S. Cl.
   CPC ............ *G06F 17/30867* (2013.01); *B04B 7/02* (2013.01); *B04B 9/12* (2013.01); *B04B 13/00* (2013.01); *B04B 15/02* (2013.01)

(58) Field of Classification Search
   CPC ............ B04B 7/02; B04B 9/12; B04B 13/00; B04B 15/00; B04B 15/02

USPC ........... 494/11–15, 38, 41, 43, 83, 84, 60, 62; 210/360.1, 380.1; 277/930
   See application file for complete search history.

(56) References Cited

U.S. PATENT DOCUMENTS

| | | |
|---|---|---|
| 3,430,849 A | 3/1969 | Nunley et al. |
| 3,759,591 A | 9/1973 | Wright et al. |
| 4,011,972 A | 3/1977 | Pederson et al. |

(Continued)

FOREIGN PATENT DOCUMENTS

| | | | |
|---|---|---|---|
| DE | 3727168 A1 * | 2/1989 | ............... B04B 7/02 |
| EP | 0930099 A | 7/1999 | |

(Continued)

OTHER PUBLICATIONS

Taiwan Search Report dated Jul. 30, 2015 for Taiwan application No. 102117011.

(Continued)

*Primary Examiner* — Charles Cooley
(74) *Attorney, Agent, or Firm* — Ohlandt, Greeley, Ruggiero & Perle L.L.P

(57) ABSTRACT

A continuous flow centrifuge system is provided. The system includes a rotor, a stator, a stator housing, upper and lower bearing plates, upper and lower bearings, first and second snap rings, and lip seal. The upper bearing rotatably secures a shaft of the rotor in the upper bearing plate. The first snap ring secures the upper bearing to the rotor shaft. The lip seal is over the upper bearing and forms a rotatable seal with the upper bearing plate. The second snap ring secures the lip seal to an inner diameter of the upper bearing plate. The upper and lower bearing plates are secured to the stator housing so that the rotor is operatively aligned with the stator.

13 Claims, 16 Drawing Sheets

(51) Int. Cl.
*B04B 15/02* (2006.01)
*G06F 17/30* (2006.01)

(56) References Cited

U.S. PATENT DOCUMENTS

| | | | |
|---|---|---|---|
| 4,205,779 A | 6/1980 | Jacobson | |
| 4,226,359 A | 10/1980 | Jacobson | |
| 4,250,752 A | 2/1981 | Ongley et al. | |
| 4,412,707 A | 11/1983 | Buffet | |
| 4,941,866 A | 7/1990 | Gorodissky et al. | |
| 4,946,433 A | 8/1990 | Gorodissky et al. | |
| 6,280,375 B1 | 8/2001 | Meisberger et al. | |
| 6,290,234 B1* | 9/2001 | Eberle | F16C 33/76 277/411 |
| 6,684,264 B1 | 1/2004 | Choi | |
| 7,144,361 B2 | 12/2006 | Aizawa et al. | |
| 7,396,324 B2* | 7/2008 | Tetsu | B04B 5/0414 494/10 |
| 7,794,383 B2 | 9/2010 | Tetsu et al. | |
| 7,901,342 B2 | 3/2011 | Tobita et al. | |
| 7,909,751 B2 | 3/2011 | Tobita et al. | |
| 8,038,592 B2 | 10/2011 | Toi et al. | |
| 2003/0114289 A1 | 6/2003 | Merino et al. | |
| 2005/0107235 A1* | 5/2005 | Tetsu | B04B 5/0414 494/10 |
| 2005/0215410 A1 | 9/2005 | Merino et al. | |
| 2006/0009341 A1* | 1/2006 | Tobita | A61L 2/07 494/14 |
| 2008/0300124 A1* | 12/2008 | Akatsu | B04B 7/02 494/14 |
| 2009/0197752 A1* | 8/2009 | Spiegel | B04B 7/02 494/7 |
| 2010/0075823 A1* | 3/2010 | Toi | B04B 5/0442 494/6 |
| 2010/0081553 A1 | 4/2010 | Aizawa | |
| 2011/0190111 A1* | 8/2011 | Toi | B04B 15/00 494/10 |
| 2012/0220441 A1* | 8/2012 | Spiegel | G06F 17/30867 494/10 |
| 2013/0017943 A1* | 1/2013 | Toi | B04B 11/02 494/2 |
| 2013/0331251 A1* | 12/2013 | Toi | B04B 9/10 494/9 |
| 2015/0057141 A1* | 2/2015 | Toi | B04B 5/10 494/10 |
| 2015/0202635 A1* | 7/2015 | Spiegel | B04B 15/00 494/14 |

FOREIGN PATENT DOCUMENTS

| | | |
|---|---|---|
| JP | 2003336234 A | 11/2003 |
| TW | 200300706 A | 6/2003 |
| TW | 560381 U | 11/2003 |
| TW | 577797 B | 3/2004 |

OTHER PUBLICATIONS

Taiwan Search Report dated Jul. 30, 2015 for Taiwan application No. 10211702.
Vietnam Office Action dated Aug. 30, 2013 for Vietnam patent application No. 1-2008-03081.
Search report and Examiner's Report dated Jan. 31, 2012 in corresponding Taiwanese Application Serial No. 97149397, including English translation.
Partial European Search Report dated Jul. 23, 2013 for European application No. 08172433.8.
Extended European Search Report dated Nov. 11, 2013 for European application No. 08172433.8.

* cited by examiner

CONTINUOUS FLOW ULTRA-CENTRIFUGATION SYSTEMS

CROSS REFERENCE TO RELATED APPLICATIONS

This application is a division of U.S. application Ser. No. 12/338,826 filed on Dec. 18, 2008, now U.S. Pat. No. 8,192,343 issued on Jun. 5, 2012, which claims the benefit of U.S. Provisional Application Ser. No. 61/008,902, filed Dec. 21, 2007, the contents of both of which are incorporated by reference herein in their entirety.

BACKGROUND OF THE INVENTION

1. Field of the Invention

The present disclosure relates to continuous flow ultra-centrifugation systems. More particularly, the present disclosure relates to continuous flow ultra-centrifugation systems having an electric drive assembly.

2. Description of Related Art

Centrifugal separation is commonly used to separate a solution into its constituent parts based on the density of the constituents. Here, the centrifugation system creates a centrifugal force field by spinning the solution containing the constituents to be separated, thus causing the constituents of higher density to separate from the solution.

Many different styles of centrifugation systems have been used and are typically classified by, among other things, the flow in the system (e.g., batch or continuous flow) and by the speed by the centrifugation (e.g., ultra-centrifugation).

Common continuous flow ultra-centrifugation systems typically rotate the rotor at speeds of more than 60,000 revolutions per minute. Many continuous flow ultra-centrifugation systems achieve such speeds using pneumatic drive systems. However, more recently electrically driven continuous flow ultra-centrifugation systems have been developed.

Unfortunately, such prior art continuous flow ultra-centrifugation systems have several common disadvantages. One common disadvantage is the size of the system, which often requires significant floor space. Another common disadvantage relates to the failure of the vacuum seals, which are located around the high-speed drive spindle. Yet another common disadvantage relates to the amount of heat generated and transferred to the solution and its constituents during the centrifugation process.

Accordingly, there is a need for continuous flow ultra-centrifugation systems that overcome, alleviate, and/or mitigate one or more of the aforementioned and other deleterious effects of the prior art systems.

BRIEF SUMMARY OF THE INVENTION

A continuous flow centrifuge system is provided. The system includes a rotor, a stator, a stator housing, upper and lower bearing plates, upper and lower bearings, first and second snap rings, and lip seal. The upper bearing rotatably secures a shaft of the rotor in the upper bearing plate. The first snap ring secures the upper bearing to the rotor shaft. The lip seal is over the upper bearing and forms a rotatable seal with the upper bearing plate. The second snap ring secures the lip seal to an inner diameter of the upper bearing plate. The upper and lower bearing plates are secured to the stator housing so that the rotor is operatively aligned with the stator.

In some embodiments, the stator housing can include a stator cooling chamber and the system can include a vapor-compression-cooling system that pumps a refrigerated coolant into the stator cooling chamber. The stator cooling chamber and the refrigerated coolant can be sufficient to prevent heating of a heating product within the system by more than about 4.0 degrees.

In other embodiments, the lower bearing plate can include a pair of ports and the stator can be positioned in the stator housing so that a power cable and a communication cable are in electrical communication with the stator through the pair of ports, respectively.

In still other embodiments, the upper bearing plate can include an inner surface that is sloped in a direction away from the lip seal.

A continuous flow centrifuge system is also provided that includes a control interface, a control cabinet, a lift assembly, a drive assembly, and a centrifugation tank assembly. The control cabinet is shaped and configured to fit under a horizontal boom of the lift assembly so that the control cabinet to occupies substantially the same foot print as the lift assembly.

A system is provided that includes a controller, a touch screen having a plurality of control icons, a controlled device, and a single safety sensor. The controller prevents operation of the controlled device without contact by a user of both the single safety sensor and a respective one of the plurality of control icons.

The above-described and other features and advantages of the present disclosure will be appreciated and understood by those skilled in the art from the following detailed description, drawings, and appended claims.

DETAILED DESCRIPTION OF THE INVENTION

Figure 1:
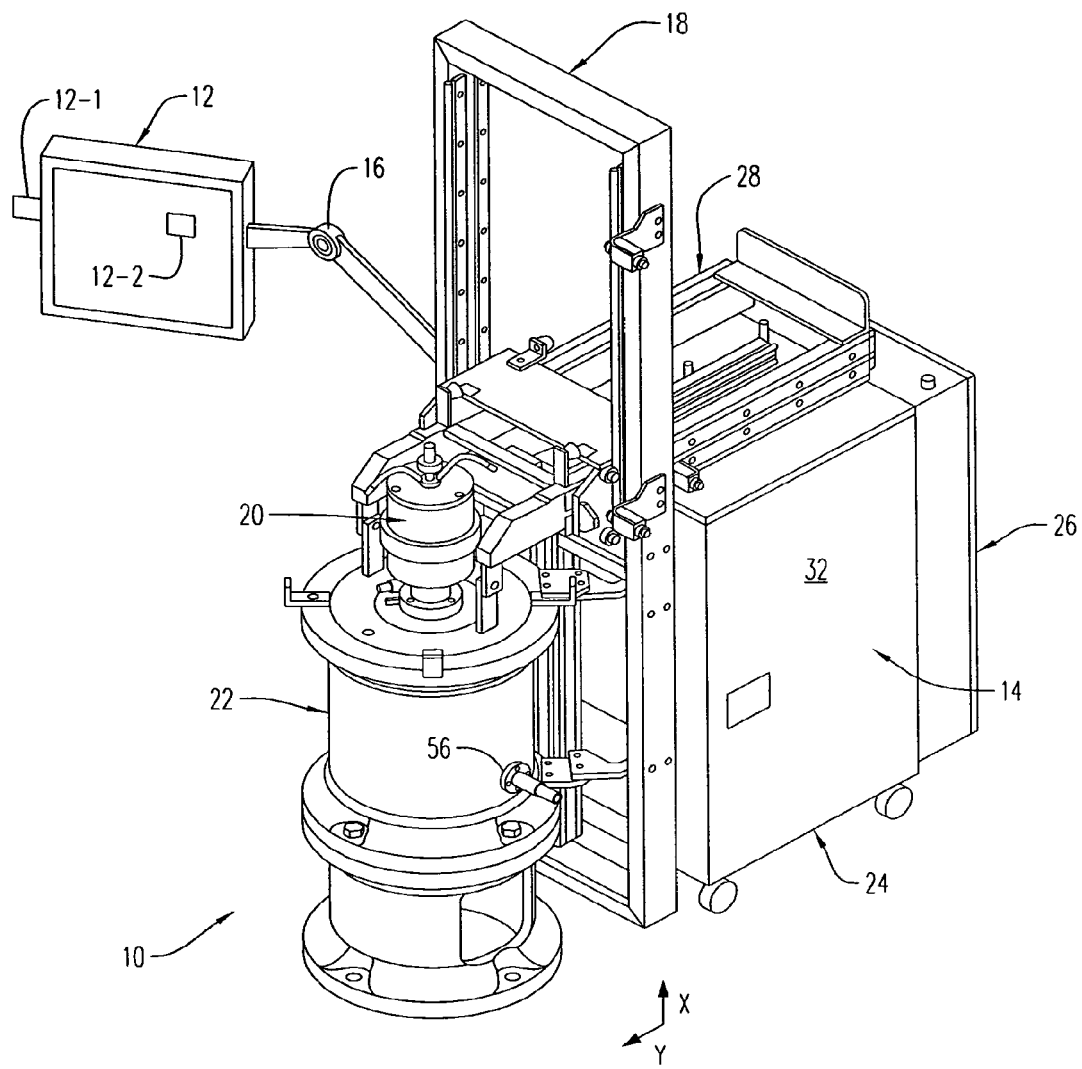
FIG. 1 is perspective view of an exemplary embodiment of a continuous flow ultra-centrifugation system according to the present disclosure.

Referring to the drawings and in particular to FIG. 1, an exemplary embodiment of a continuous flow ultra-centrifugation system according to the present disclosure is shown and is generally referred to by reference numeral 10.

Continuous flow ultra-centrifugation system 10 (hereinafter "system") includes a control interface 12, a control cabinet 14, a lift assembly 18, a drive assembly 20, and a centrifugation tank assembly 22.

Control interface 12 is secured to lift assembly 18 by an arm 16. In the illustrated embodiment, arm 16 is a moveable arm that allows an operator move the control interface to a desired position with respect to system 10. Of course, it is contemplated by the present disclosure for control interface 12 to be secured to any component of system 10 such as, but not limited to, control cabinet 14, drive assembly 20, centrifugation tank assembly 22, and any combinations thereof.

Control interface 12 is in electrical communication with, for example, control cabinet 14, lift assembly 18, and drive assembly 20 to allow the operator to control the various movements and operations of system 10 from one central location. Control interface 12 can be any human-machine-interface (HMI). Preferably, interface 12 is a touch screen that allows the operator to control the various components of system 10.

Due to various safety regulations, it is common for many controlled devices, such as system 10, to require two hand control devices a predetermined distance from one another. Typically, both hand control devices must be activated, indicating that the operator's hands are out of danger from any moving parts, before the control devices activate the controlled device. Unfortunately, the use of a touch screen for interface 12 has made compliance to this safety requirement difficult.

Advantageously, system 10 is configured to provide this desired safety feature while maintaining the use of a touch screen as control interface 12. Here, system 10 can include a safety sensor 12-1 used in conjunction with any one of a plurality of programmed control icons 12-2 (only one shown) resident on control interface 12. Safety sensor 12-1 is positioned on a side or rear of control interface 12 so that the safety sensor is a desired distance from programmed control icons 12-2.

In this manner, system 10 is configured so that the operator must, during certain operations, maintain one hand on safety sensor 12-1 and the other hand on a respective one of the programmed control icons 12-2. Thus, the removal of a hand from any control button 12-1 or icon 12-2 will result in system 10 stopping the particular operation. Accordingly, system 10 provides the enhanced ease of use features available when using a touch screen interface 12, while ensuring operator safety by way of safety sensor 12-1.

In the illustrated embodiment, lift assembly 18 is shown as a two-axis lift, which is configured to move in at least a vertical direction (x) and a horizontal direction (y). In this manner, lift assembly 18 is configured to, under the control of the operator via interface 12, lift and remove drive assembly 20 from tank assembly 22 in a known manner. However, it is also contemplated by the present disclosure for lift assembly 18 to be a single-axis lift or a three-axis lift as desired.

Figure 3:
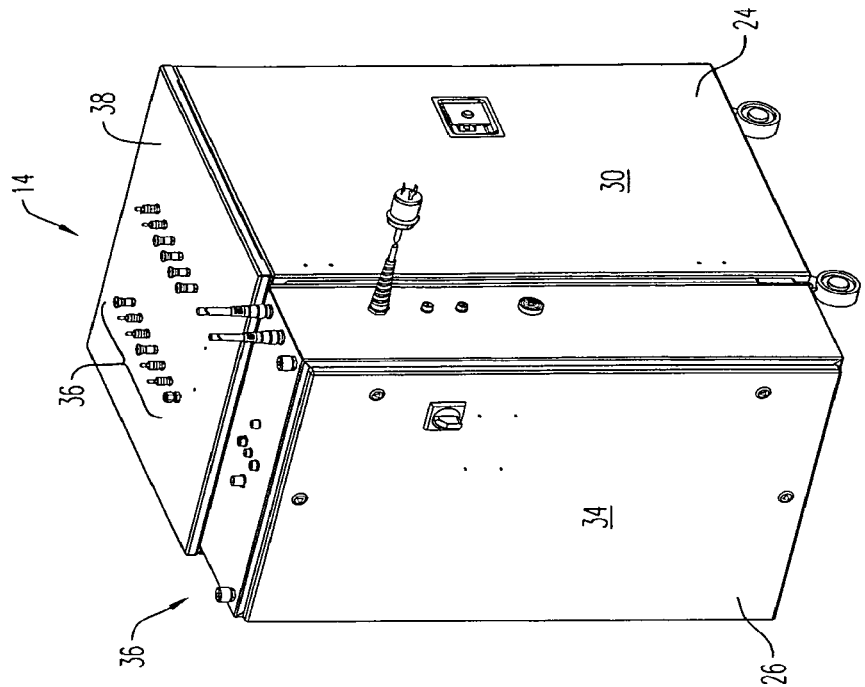
FIG. 3 is an opposite perspective view of the control cabinet of FIG. 2.

Control cabinet 14 includes a mechanical enclosure 24 and an electrical enclosure 26. A more detailed discussion of control cabinet 14 is made by way of reference to FIGS. 1-3.

Advantageously, control cabinet 14 is shaped and configured to fit under the horizontal boom 28 of lift assembly 18. In this manner, the foot print of system 10 can be reduced by allowing control cabinet 14 to occupy substantially the same foot print as lift assembly 18.

Mechanical enclosure 22 includes an operator access panel 30 and a first service access panel 32, while electrical enclosure 26 includes a second service access panel 34. Advantageously and as will be described in more detail below, the various components within control cabinet 14 are positioned for access via operator access panel 30, first service access panel 32, and second service access panel 34 by the appropriate personnel.

For example, the components within control cabinet 14 that are commonly accessed and used by an operator can easily be accessed via operator access panel 30. Conversely, components within control cabinet 14 that are commonly accessed and used by service personnel (e.g., mechanics, electricians, engineers, etc) can easily be accessed via first and second service access panels 32, 34, respectively.

In addition and as will be described in more detail below, control cabinet 14 is organized so that the various connectors 36, which include, but are not limited to, fluid connectors, pneumatic connectors, oil connectors, electrical connectors, and communication connectors, generally exit the control cabinet from an upper panel 38 of the control cabinet.

In some embodiments, one or more connectors 36 can also exit from a front panel 40 of control cabinet 14, where the front panel 40 is adjacent to and faces tank assembly 22.

In this manner, control cabinet 14 is a universal cabinet, namely one that does not require special configuration as a left-handed or right-handed system. Rather, the only component of system 10 that need be established in a left or right position is control interface 12, which can easily be secured to the left or right sides of lift assembly 18 as needed.

In other embodiments, control cabinet 14 can include one or more organization lugs 42 defined on front panel 40. As can be imagined, the use of system 10 requires numerous conduits, wires, and cables (not shown) that are connected between connectors 36 and the various components of the system such as, but not limited to, control interface 12, lift assembly 18, drive assembly 20, and centrifugation tank assembly 22. Advantageously, lugs 42 allow the operator to maintain the conduits, wires, and cables in a desired and organized location by using to lugs to secure the conduits, wires, and cables in the desired location.

Figure 4:
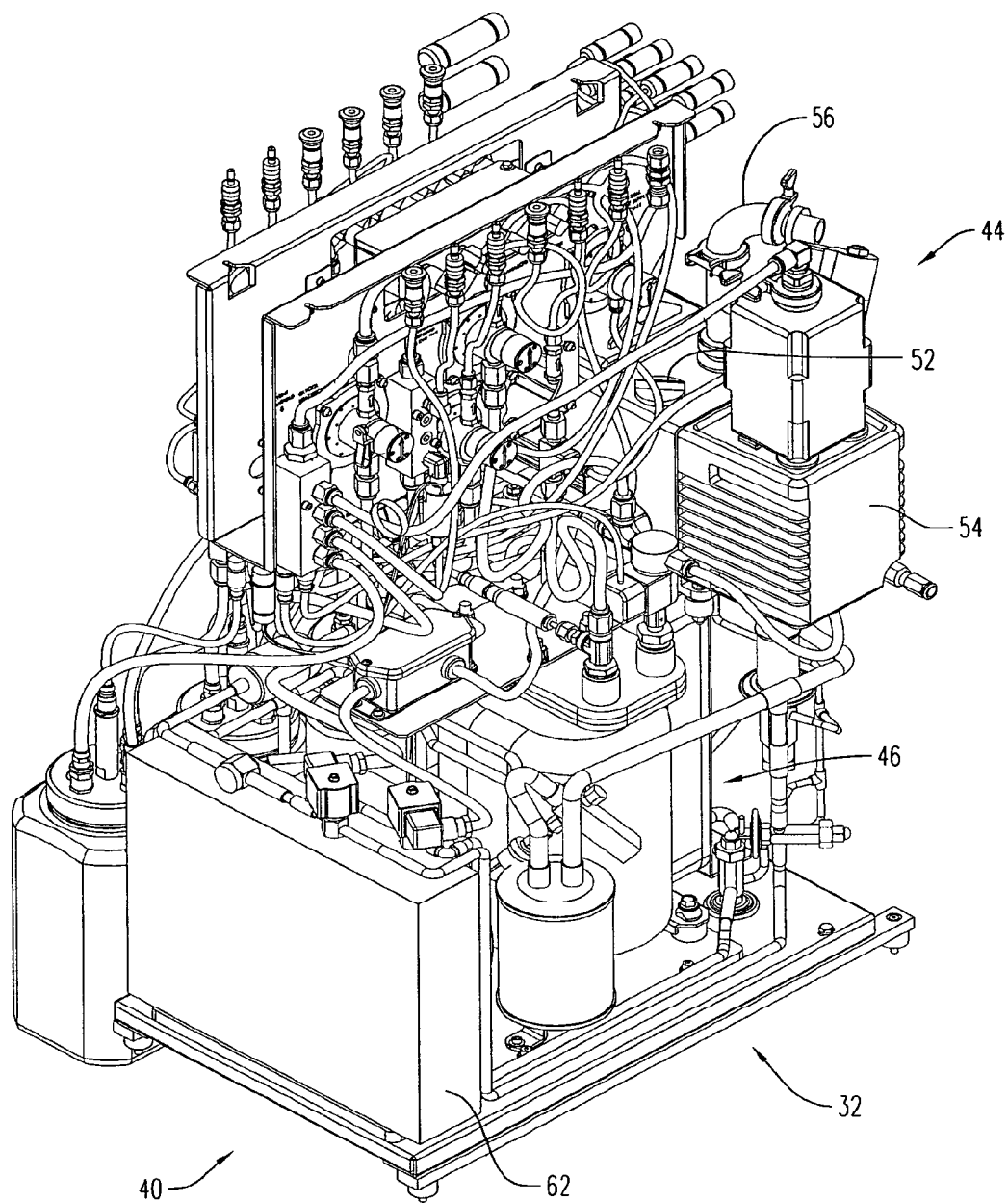
FIG. 4 illustrates the control cabinet of FIG. 2 having various covers removed to illustrate the components therein.
Figure 5:
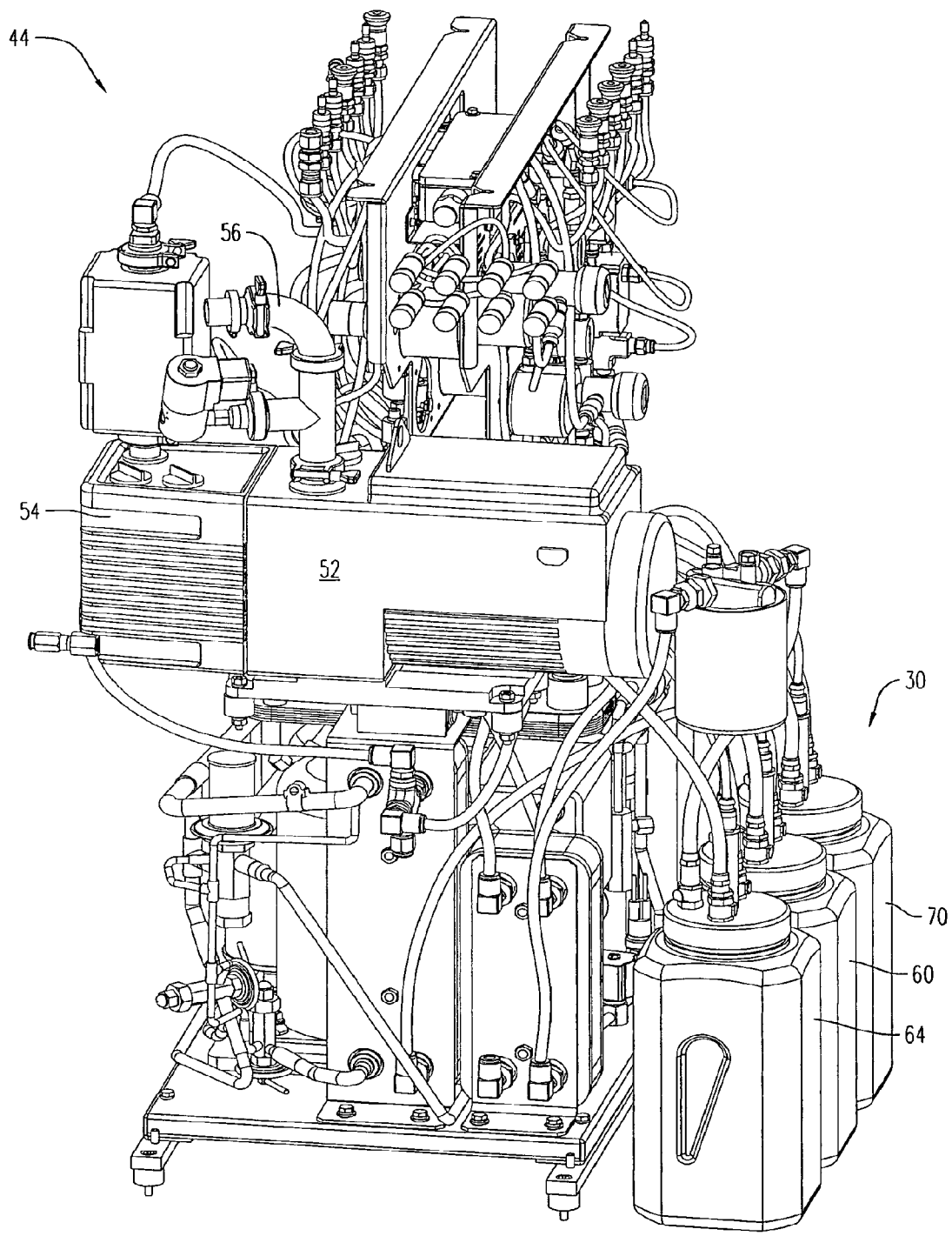
FIG. 5 illustrates the control cabinet of FIG. 3 having various covers removed to illustrate the components therein.
Figure 6:
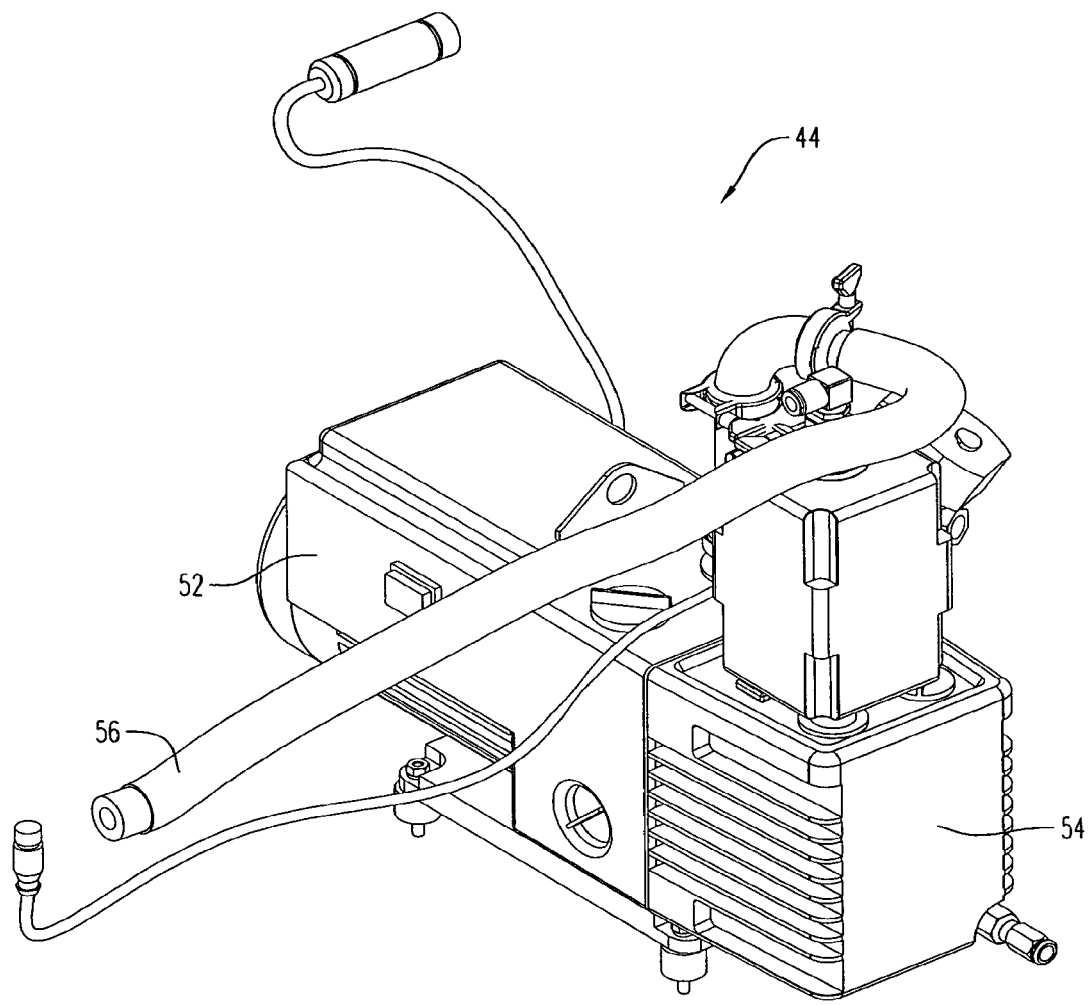
FIG. 6 is a perspective view of an exemplary embodiment of a vacuum assembly of the control cabinet.

The internal components of control cabinet 14 are described with reference to FIGS. 4 through 10. FIG. 4 illustrates a view of control cabinet 14 as accessible from first service access panel 32 and front panel 40, while FIG. 5 illustrates a view of the control cabinet as accessible from operator access panel 30.

Although not illustrated, electrical enclosure 26 includes a plurality of known electrical controls including, but not limited to, one or more programmable logic controllers (PLC's), one or more relays, one or more circuit breakers, and other electrical controls. As such, an electrician or controls engineer can access the components in electrical enclosure via second service access panel 34.

Control cabinet 14 includes a vacuum assembly 44, a vapor-compression-cooling system 46, an oil filter assembly 48, and a coolant assembly 50.

Vacuum assembly 44 includes a motor 52 drivingly engaged to a vacuum pump 54. Vacuum assembly 44 is in fluid communication with tank assembly 22 via a vacuum hose 56.

Advantageously, vapor-compression-cooling system 46 is in control cabinet 14 and, thus, can be used to providing cooling to drive assembly 20 as is described herein below.

Vapor-compression-cooling system 46 includes a compressor, an evaporator, an expansion device, and a condenser in fluid communication with one another so that a refrigerant is compressed and expanded in a known manner.

Figure 7:
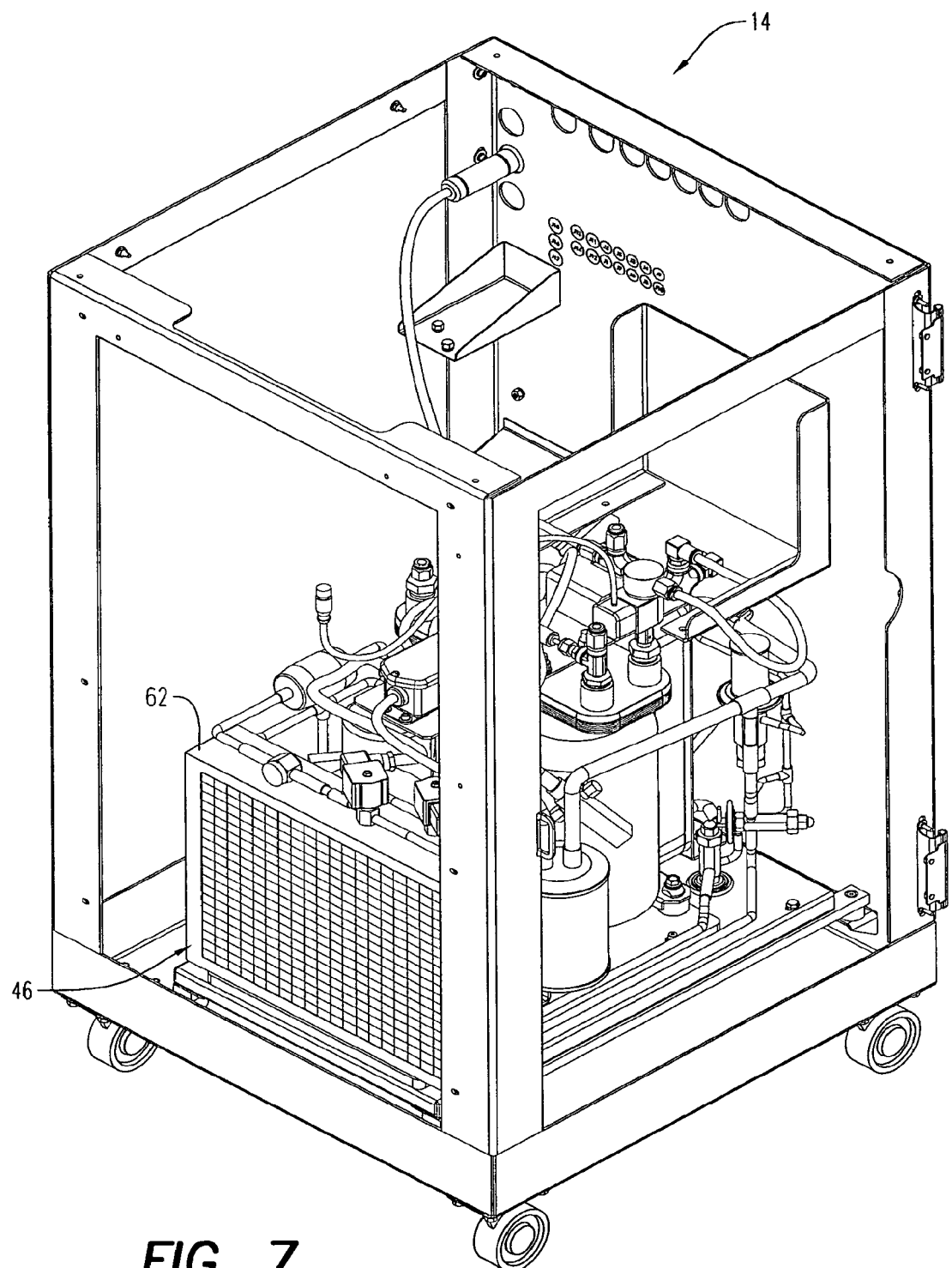
FIG. 7 illustrates an exemplary embodiment of a vapor-compression-cooling system of the control cabinet.

Vapor-compression-cooling system 46 further includes a first coolant reservoir 60 of coolant (FIG. 5) such as, but not limited to, glycol and a first heat exchanger 62 (FIGS. 4 and 7). First heat exchanger 62 is in a heat exchange relationship with the condenser so that vapor-compression-cooling system 46 is configured to condition or refrigerate the coolant.

Importantly, control cabinet 14 is configured to pump the refrigerated coolant from reservoir 60 to tank assembly 22 and to drive assembly 20, which is described in more detail below.

Figure 8:
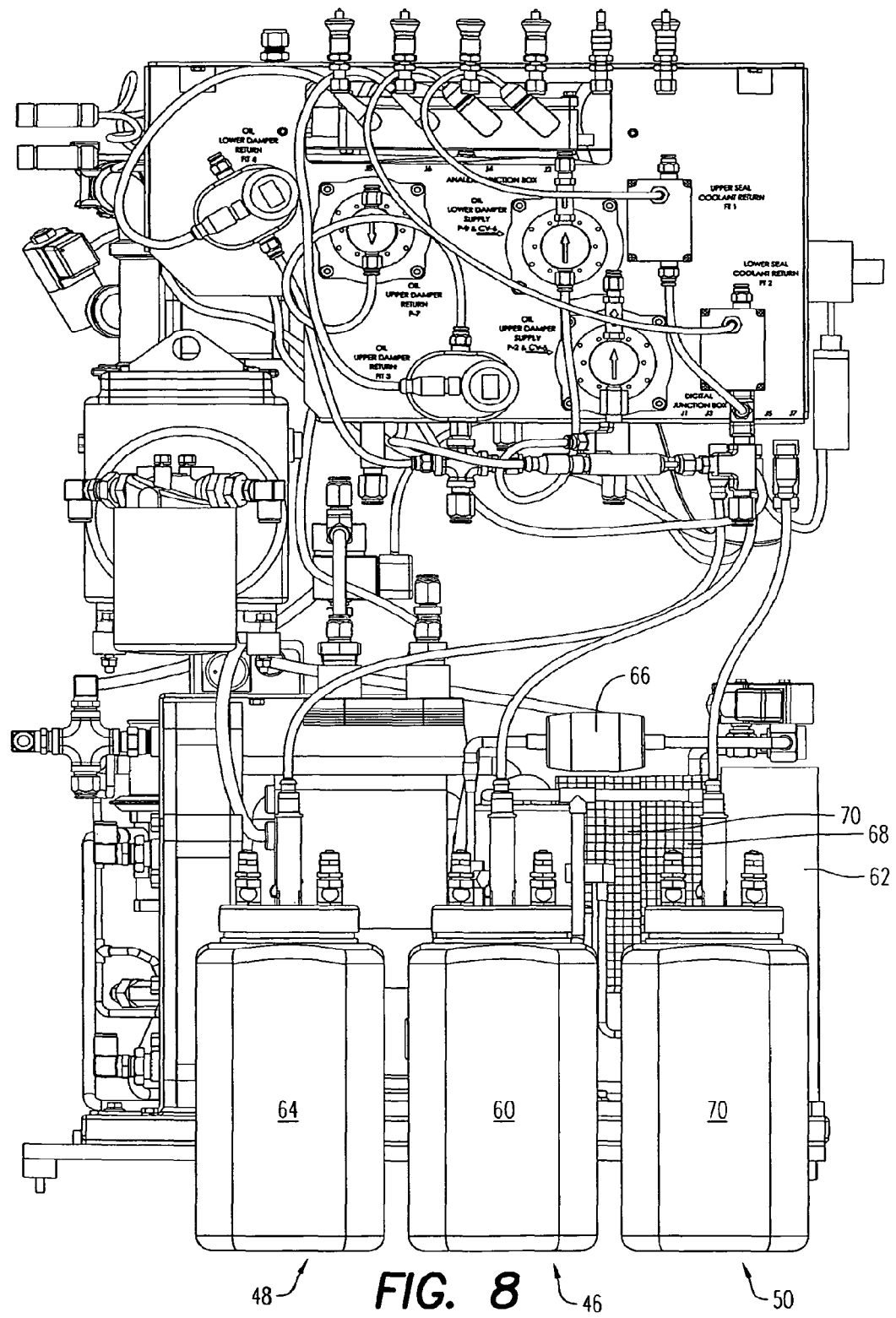
FIG. 8 illustrates an exemplary embodiment of an oil filter assembly and a coolant assembly of the control cabinet.

Oil filter assembly 48 includes an oil reservoir 64 (FIG. 5) and a filter 66 (FIG. 8). Control cabinet 14 is configured to pump the oil from reservoir 64 to the upper and lower dampers of tank assembly 22, which is described in more detail below. In some embodiments, control cabinet 14 is configured to pump the oil from reservoir 64 through a heat exchanger 68 in heat exchange relationship with the refrigerated coolant from reservoir 60 to cool the oil.

Coolant assembly 50 includes a second coolant reservoir 70 (FIG. 5) having a coolant such as, but not limited to, water and a heat exchanger 72 (FIG. 8). Heat exchanger 72 is in a heat exchange relationship with the condenser so that vapor-compression-cooling system 46 is configured to condition or refrigerate the second coolant. Control cabinet 14 is configured to pump the coolant from reservoir 70 to the upper and lower seals of drive assembly 20, which is described in more detail below.

Control cabinet 14 controls the operation of vacuum assembly 44, vapor-compression-cooling system 46, oil filter assembly 48, and coolant assembly 50. Further, control cabinet 14 is in electrical communication with interface 12 so that the operator can control each component within the control cabinet.

Figure 2:
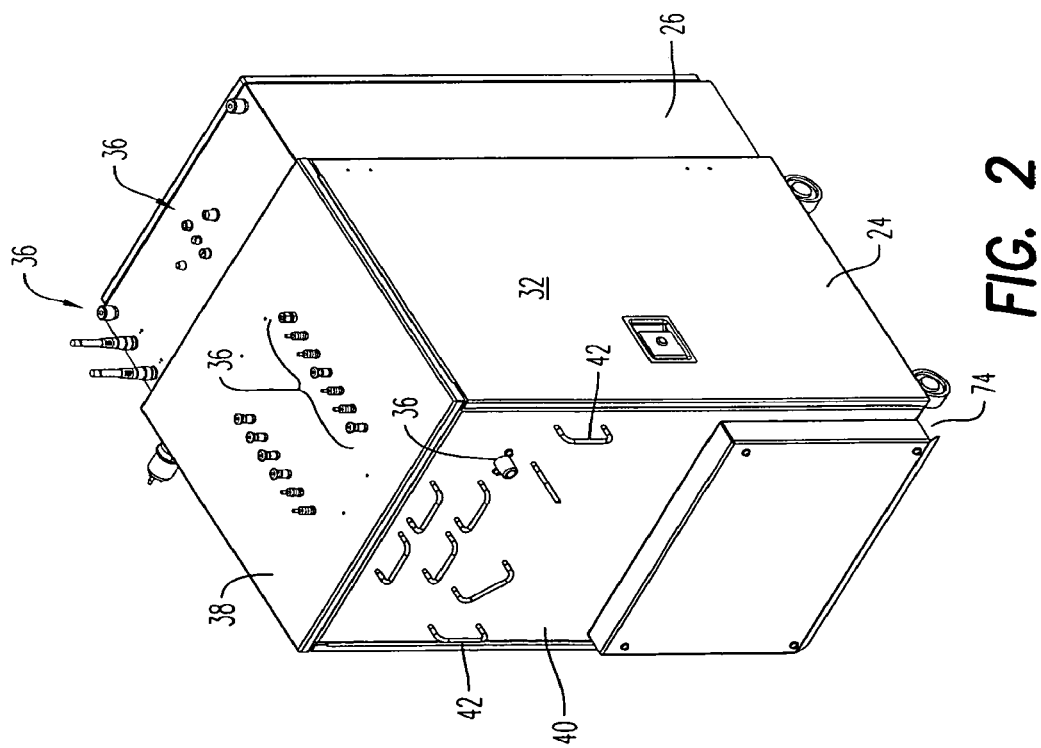
FIG. 2 is a perspective view of an exemplary embodiment of a control cabinet of FIG. 1.

In some embodiments, control cabinet 14 can include a vent 74, shown in FIG. 2, for venting air from within the cabinet to an exterior of the cabinet through a filter (not shown). In certain clean room applications, control cabinet 14 can be vented to an exterior of the clean room via a conduit (not shown) in fluid communication with vent 74.

Figure 9:
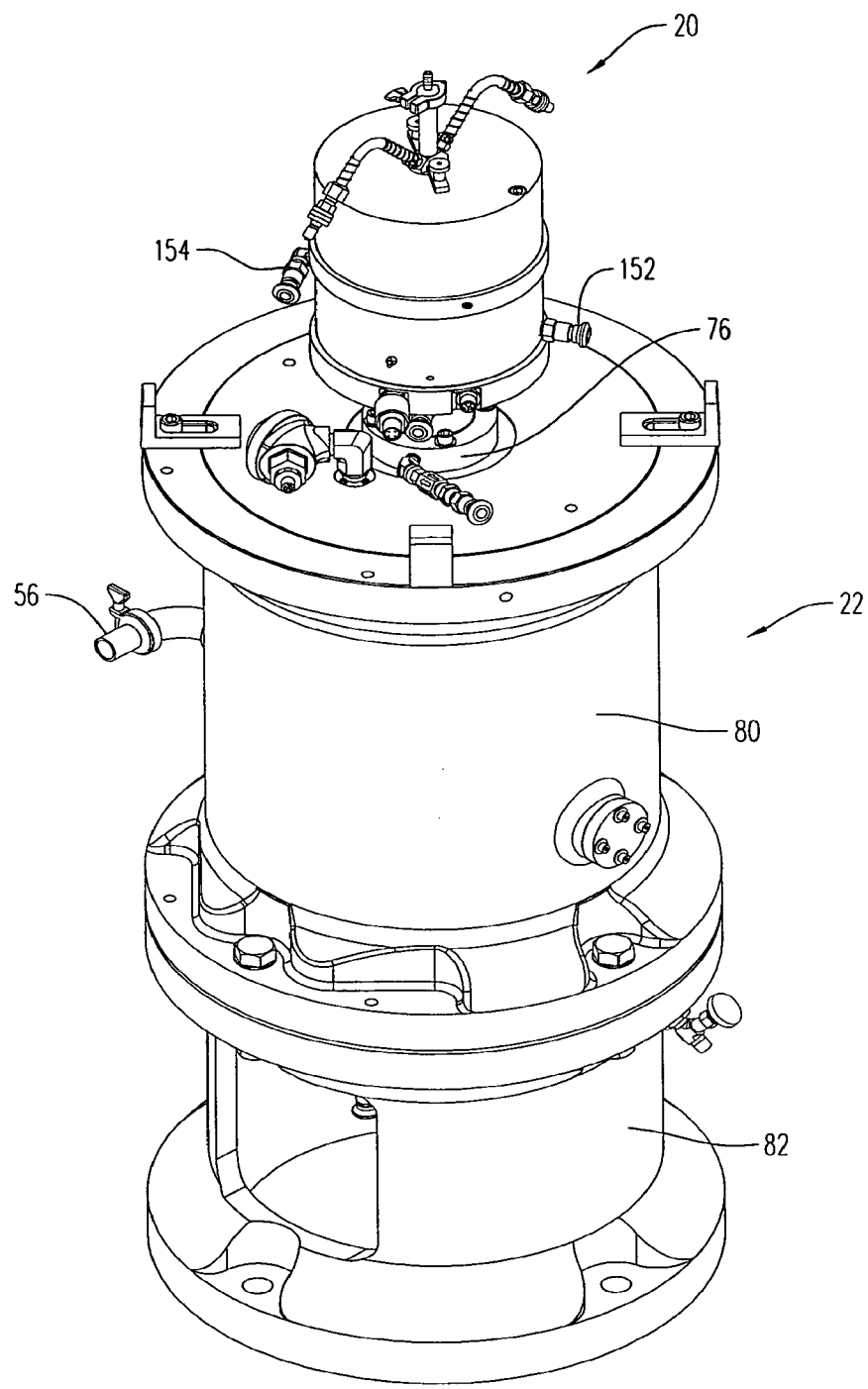
FIG. 9 is a perspective view of a drive assembly and a centrifuge tank assembly according to the present disclosure for use with the system of FIG. 1.
Figure 10:
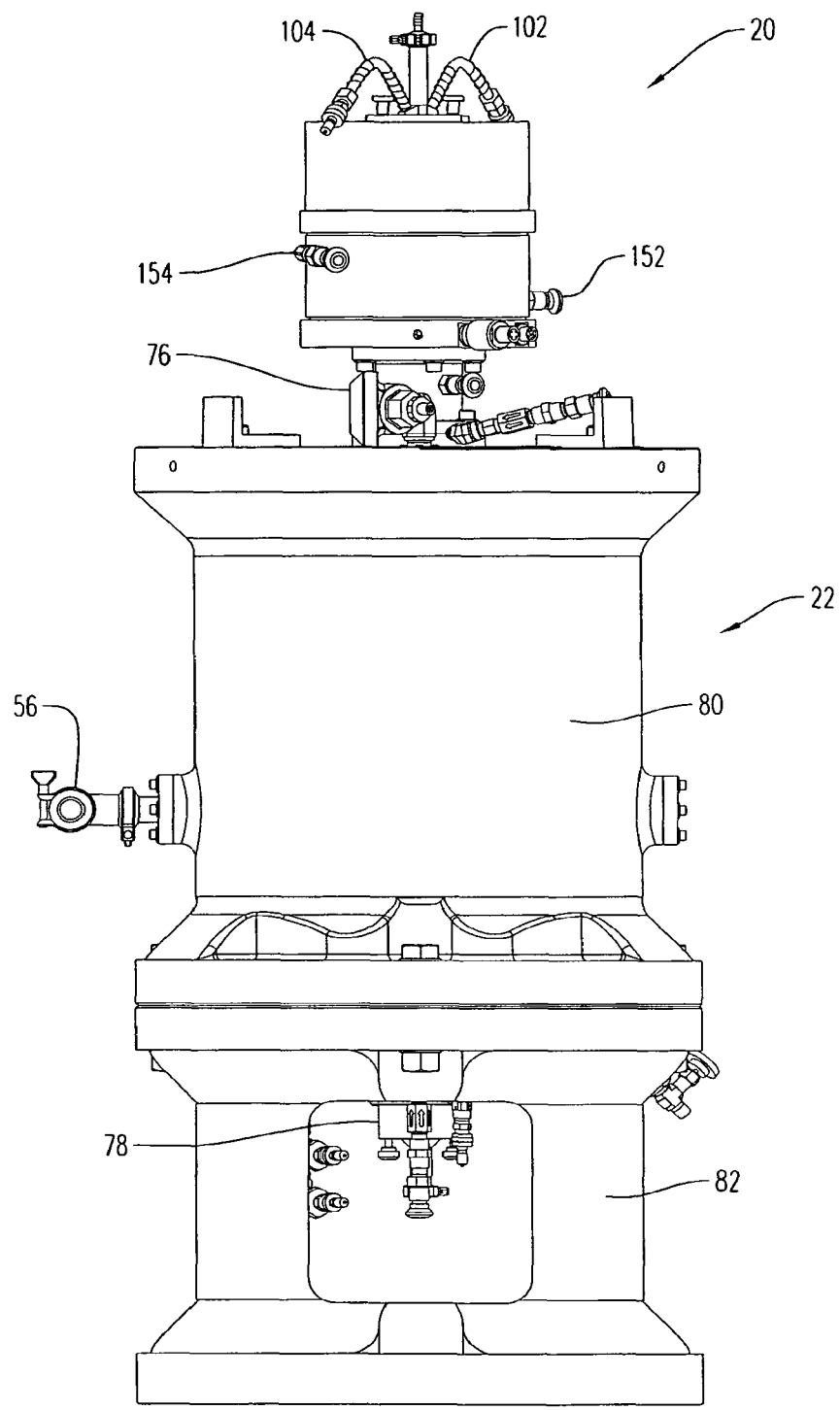
FIG. 10 is a side view of the drive assembly and centrifuge tank assembly of FIG. 9.

Referring now to FIGS. 9 and 10, centrifuge tank assembly 22 is described in more detail with reference thereto. Centrifuge tank assembly 22 includes an upper vibration damper 76, a lower vibration damper 78, a centrifuge tank 80, and a centrifuge base 82. Centrifuge tank assembly 22 is commercially available from the assignee of the present application and thus is not described in detail herein. Rather, drive assembly 20 of the present disclosure is configured to mate with the known upper vibration damper 76.

Referring now to FIGS. 11 through 17, drive assembly 20 is described in more detail with reference thereto. Drive assembly 20 includes an upper housing 90, a rotor assembly 92, and a stator assembly 94.

Upper housing 90 is secured to rotor assembly 92 at an outer housing 140 to define an upper seal chamber 96 (FIG. 17) above the rotor assembly. Upper housing 90 having upper seal chamber 96 is commercially available from the assignee of the present application and thus is not described in detail herein. Rather, drive assembly 20 of the present disclosure is configured to mate with the known upper housing 90 having upper seal chamber 96.

Figure 17:
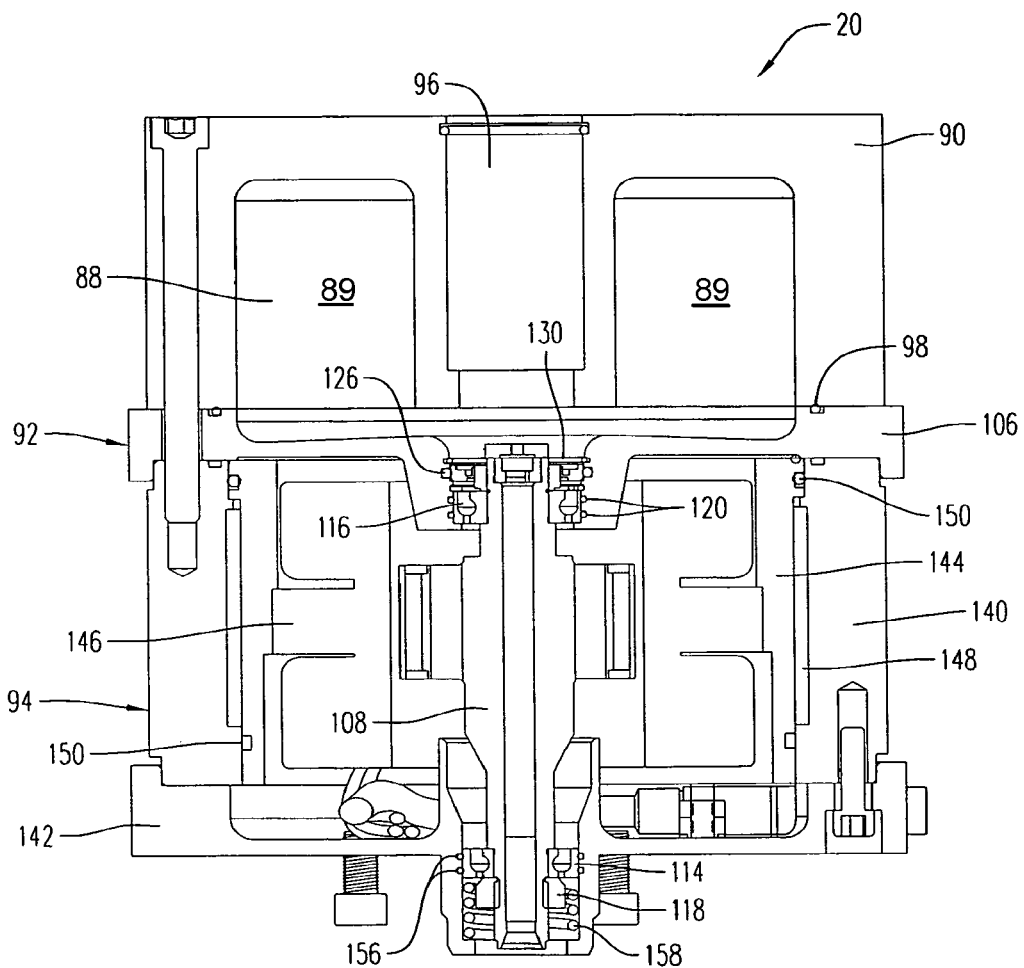
FIG. 17 is a sectional view of the drive assembly of FIG. 11.

In addition, upper housing 90 is secured to rotor assembly 92 at outer housing 140 to define an air chamber 88 as seen in FIG. 17. For example, upper housing 90 can include an upper seal o-ring 98 (FIGS. 12 and 17) secured between outer housing 140 of rotor assembly 92 and the upper housing by one or more bolts 100. In this manner, air chamber 88 defines a substantially fluid tight chamber, which mitigates noise from emanating from drive assembly 20 and prevents spills of cooling fluid, in the event upper seal chamber 96 leaks into air chamber 88.

In some embodiments, it is contemplated for drive assembly 20 to include a sound absorber feature 89 within air chamber 88. For example, it is contemplated for drive assembly 20 to include a sound absorbing material such as, but not limited to, an open or closed cell foam member within air chamber 88. In another example, it is contemplated for the sound absorber feature of drive assembly 20 to include one or more sound baffles or machined features within air chamber 88 to absorb and/or attenuate noise therein. Further, it is contemplated for the sound absorber feature of drive assembly 20 to include any combination of sound absorbing material and the sound attenuating baffles/features.

Figure 11:
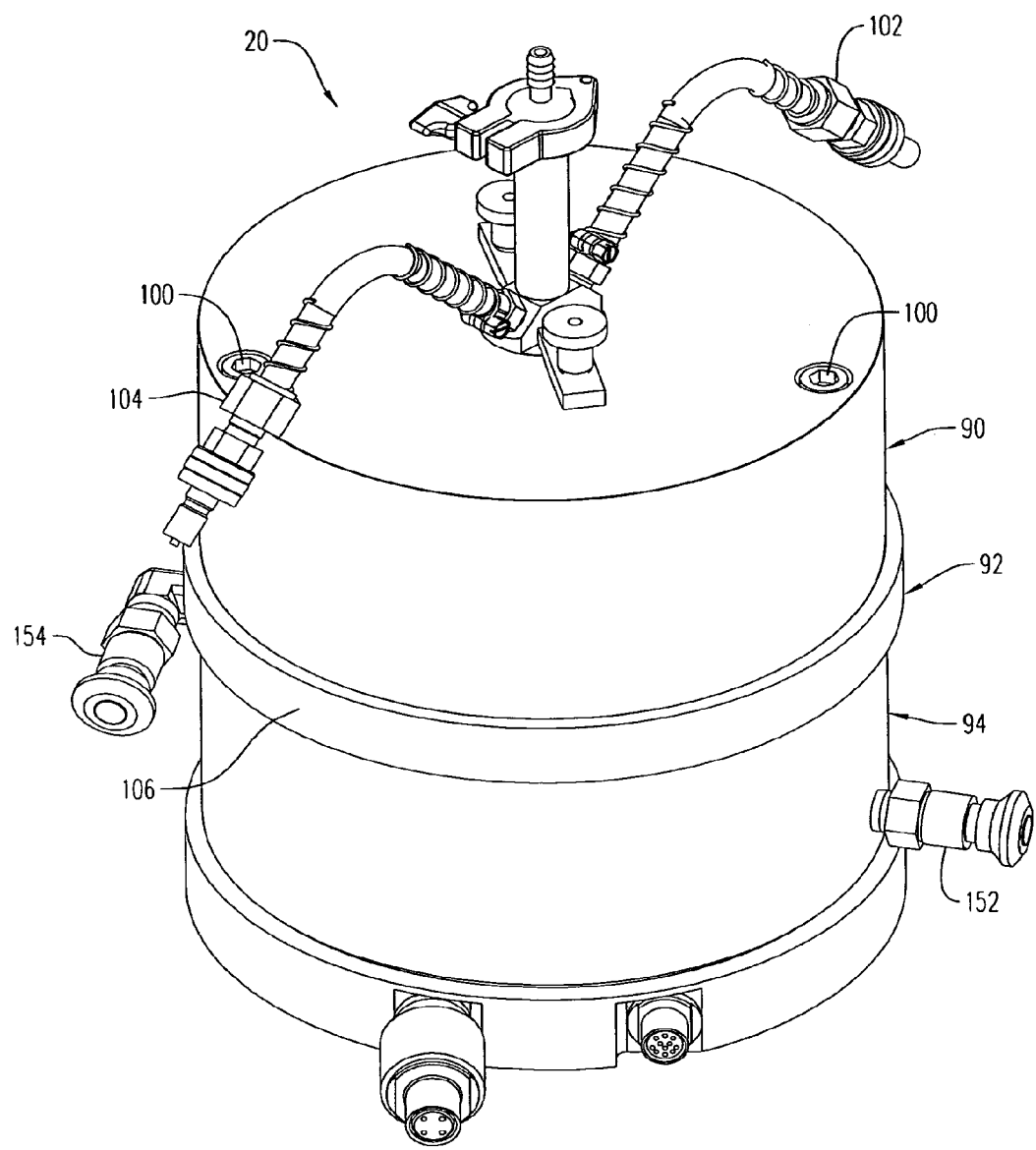
FIG. 11 is a perspective view of the drive assembly of FIG. 1.
Figure 12:
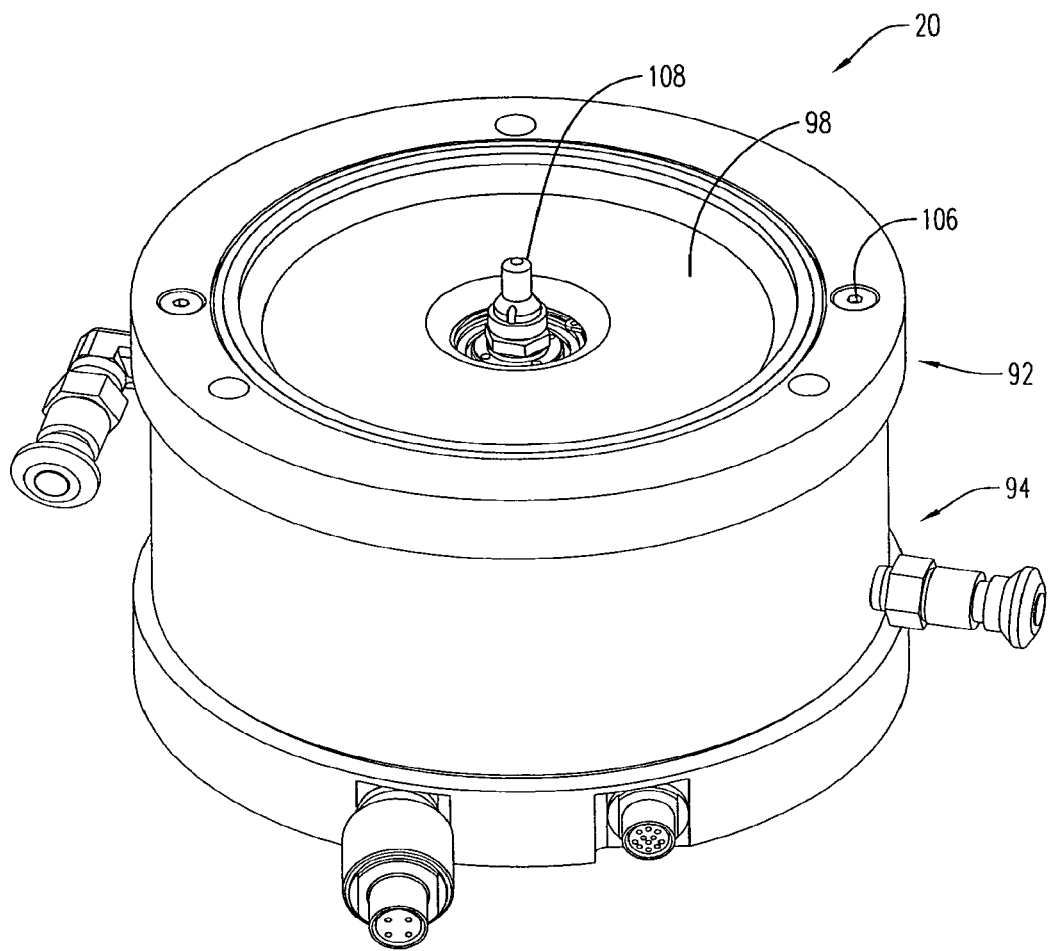
FIG. 12 is a perspective view of the drive assembly of FIG. 11 having an upper cover removed.

Coolant assembly 50 pumps coolant from reservoir 70 into upper seal chamber 96 via a first port 102 and returns the coolant to the reservoir via a second port 104 (FIG. 11). In this manner, coolant assembly 50 is configured to cool the upper seal within upper seal chamber 96.

Figure 13:
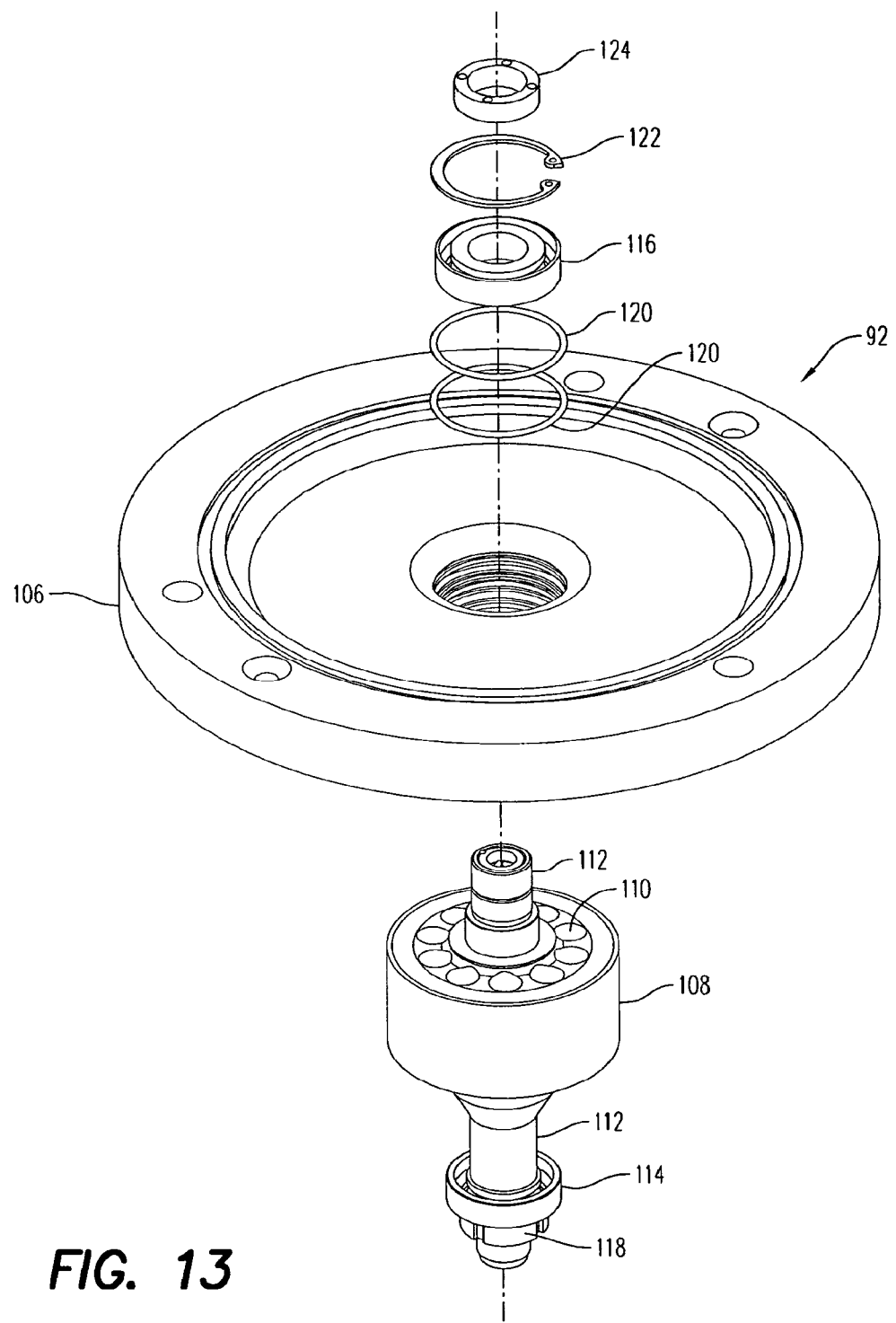
FIG. 13 is a first partial exploded view of a rotor assembly of the drive assembly of FIG. 11.
Figure 14:
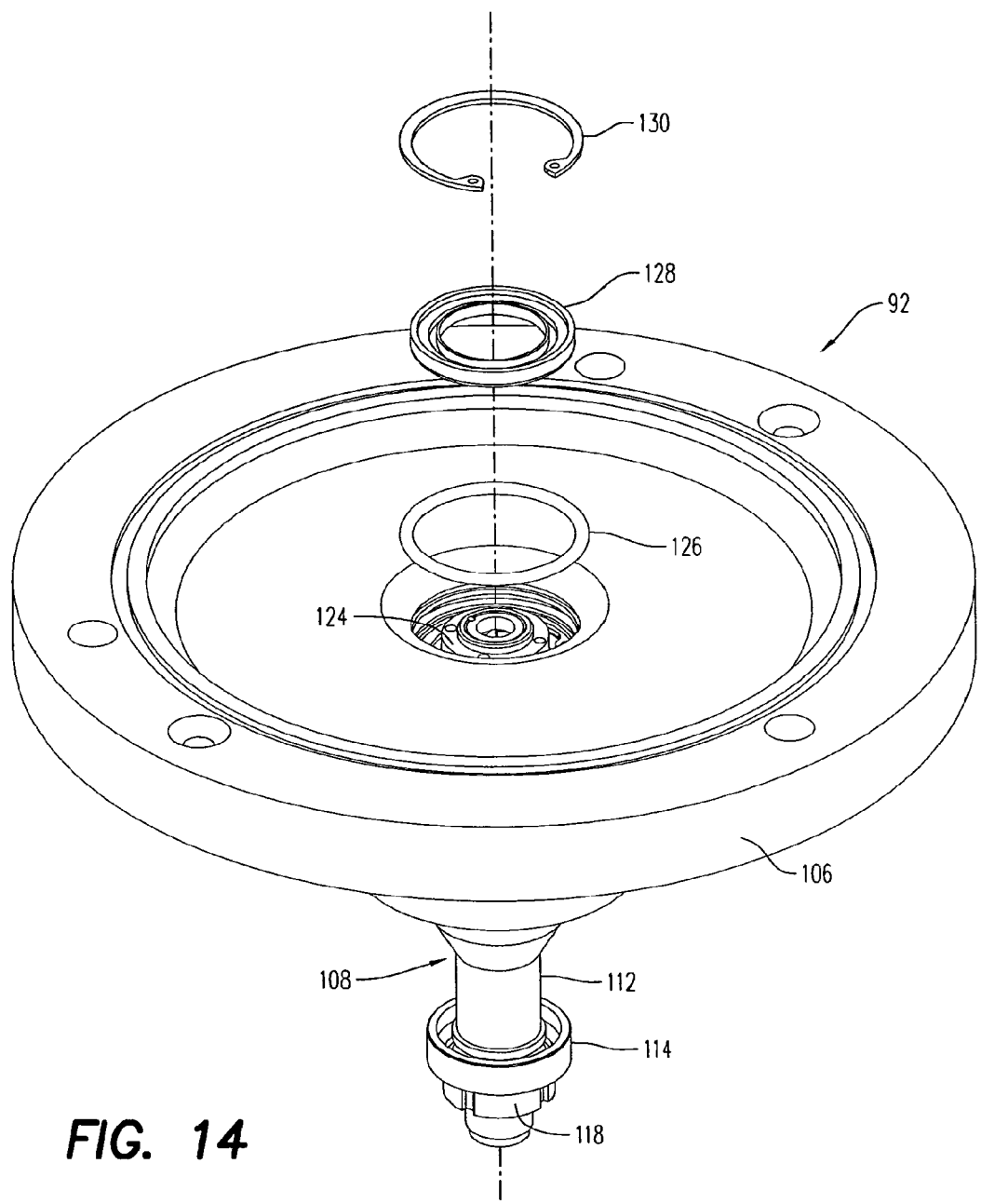
FIG. 14 is a second partial exploded view of the rotor assembly of FIG. 13.
Figure 15:
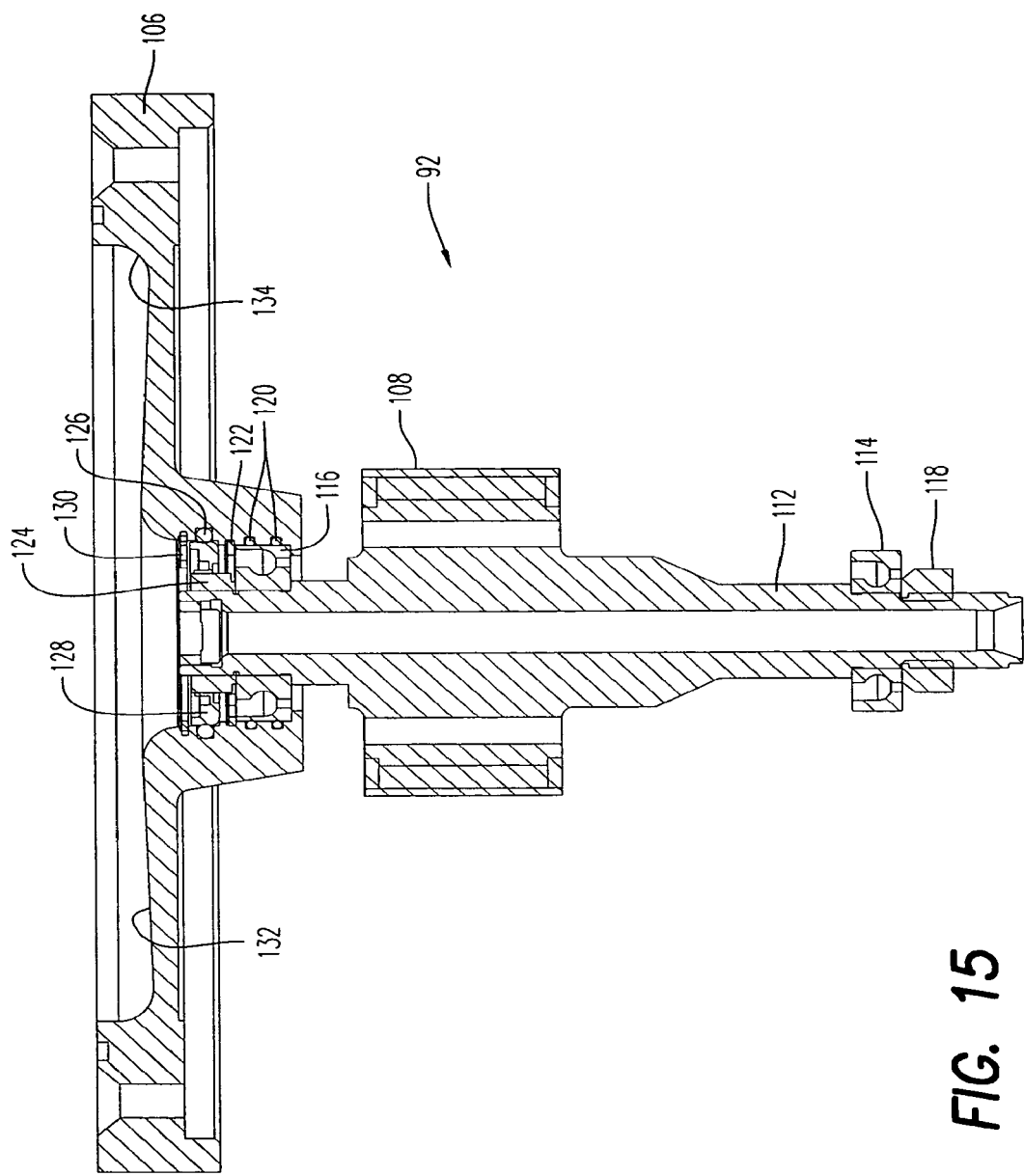
FIG. 15 is a sectional view of the rotor assembly of FIG. 13 in an assembled state.

Rotor assembly 92 includes an upper bearing plate 106 and a rotor 108 as seen in FIGS. 13 through 15.

Rotor 108 includes a plurality of magnets 110 disposed therein in a known manner and a hollow rotor shaft 112. Rotor assembly 92 also includes a lower bearing 114 and an upper bearing 116. Lower bearing 114 is secured to shaft 112 by a lower jam nut 118. Upper bearing 116 is sealed within upper bearing plate 106 by one or more o-rings 120 (two shown) and is maintained on shaft 112 by a snap-ring 122 and an upper jam nut 124. Snap-ring 122 is resiliently engaged in a groove (not shown) of shaft 112.

In addition, the upper bearing 116 is sealed from the contents of upper bearing plate 106. For example, rotor assembly 92 can include an o-ring 126, a lip seal 128, and an internal snap ring 130. Lip seal 128 forms a rotatable seal with shaft 112 over upper jam nut 124. O-ring 126 forms a seal between an inner surface of bearing plate 106 and an outer surface of lip seal 128. Snap-ring 130 is resiliently engaged in a groove (not shown) of bearing plate 106.

Lip seal 128 can be made of any material sufficient to withstand the conditions within drive assembly 20. In an exemplary embodiment, lip seal 128 is made of polytetrafluoroethylene (PTFE).

Advantageously, drive assembly 20 does not require rotor assembly 92 to be held in a vacuum environment, thus allowing more effective cooling of the rotor 108. For example, eliminating the vacuum environment from the area around rotor 108 allows cooling from stator assembly 94, which is described in more detail below, to convectively cool the rotor across the motor gap.

Upper bearing plate 106 includes an inner surface 132 that is sloped in a direction away from lip seal 128. In this manner, any cooling fluid that may leak into air chamber 88 due to a failure of the seal in upper seal chamber 96 is urged away from lip seal 128 by the force of gravity into a collection area 134. Thus, upper bearing plate 106 can assist in maintaining the seal provided by lip seal 128 by ensuring that the cooling fluid does not collect on the lip seal, but rather is moved away from the lip seal towards collection area 134.

Figure 16:
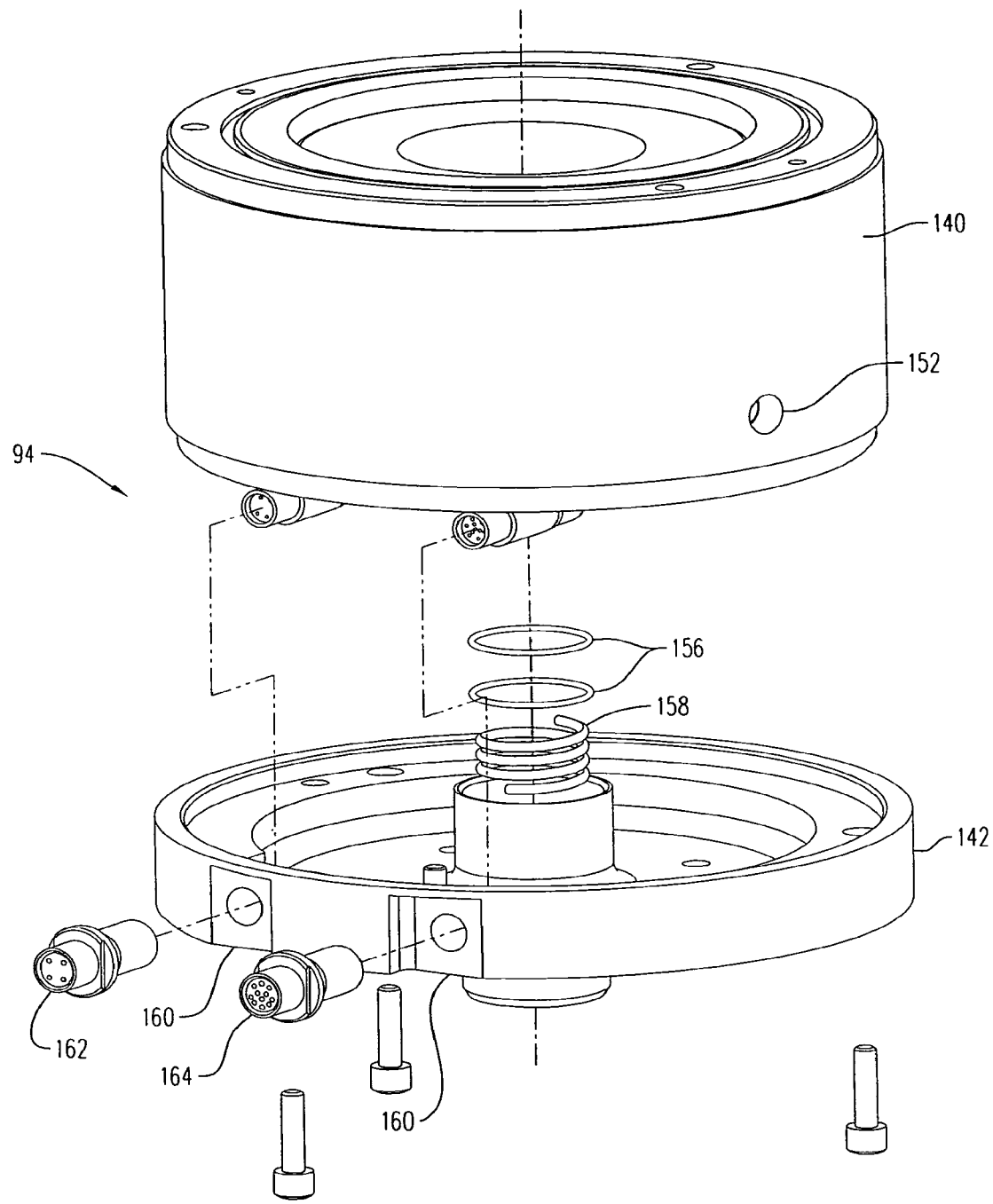
FIG. 16 is a perspective exploded view of a stator assembly of the drive assembly of FIG. 11.

Stator assembly 94 includes an outer housing 140, a lower bearing plate 142, an inner housing 144, and stator windings 146 as shown in FIGS. 16 and 17.

Outer and inner housings 140, 144 define a stator cooling chamber 148 therebetween. For example, outer and inner housings 140, 144 can be secured to one another so that a pair of o-rings 150 ensure chamber 148 is substantially fluid tight.

Vapor-compression-cooling system 46 pumps refrigerated coolant from reservoir 60 into stator cooling chamber 148 via a first port 152 and returns the coolant to the reservoir via a second port 154 (FIG. 11). In this manner, cooling system 46 is configured to cool drive assembly 20. As rotor assembly 92 of the present disclosure is not a vacuum environment, the cooling of inner housing 144 radiates across the air gap and convectively transfers across the air gap to cool rotor 108.

Without wishing to be bound by any particular theory, it is believed that the use of refrigerated coolant from reservoir 60 to cool drive assembly 20 is effective to prevent the drive assembly from heating product within system 10. For example, system 10 finds particular use in the production of viral vaccines, which are commonly manufactured in egg based media. It has been determined by the present disclosure that heating of the egg based media, and thus, the product by more than about 4.0 degrees Celsius (° C.) is detrimental to the resultant product.

Thus, drive assembly 20 of the present disclosure, which includes cooling via circulation of refrigerated coolant through stator cooling chamber 148, is effective at removing sufficient heat generated by the drive assembly so that the temperature of product flowing through the drive assembly increases by no more than about 4.0° C. Preferably, drive assembly 20 is effective at removing sufficient heat so that the temperature of product flowing through the drive assembly increases by no more than about 0.0° C. Most preferably, drive assembly 20 is effective at removing sufficient heat so that the temperature of product flowing through the drive assembly decreases by up to about 4.0° C. or more.

Lower bearing 114 of rotor assembly 92 is sealed within lower bearing plate 142 by one or more o-rings 156 (two shown) so that the lower bearing rests on a resilient member 158.

Lower bearing plate 142 includes a pair of ports 160 for providing a power cable 162 and a communication cable 164 from control cabinet 14 to stator windings 146. More particularly, stator windings 146 are inverted as compared to other motors so that communication ports 160 are formed in lower bearing plate 142 instead of upper bearing plate 106. In this manner, upper bearing plate 106 does not require ports defined therein.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A continuous flow centrifuge system comprising:
   a control interface comprising a touch screen;
   a control cabinet including a controller controlled by said touch screen;
   a lift assembly having a horizontal boom extending therefrom;
   a drive assembly;
   a centrifugation tank assembly drivingly coupled with said drive assembly, said lift assembly being configured to lift and remove said drive assembly from said centrifugation tank assembly, wherein said control cabinet is shaped and configured to fit under said horizontal boom of said lift assembly so that said control cabinet occupies substantially the same foot print as said lift assembly, wherein said touch screen has a plurality of control icons in communication with said controller to control one or more of said lift assembly, said drive assembly, and said centrifugation tank assembly; and
   a single safety sensor, said controller being configured to prevent operation of said lift assembly, said drive assembly, and said centrifugation tank assembly without contact by a user of both said single safety sensor and a respective one of said plurality of control icons.

2. The continuous flow centrifuge system of claim 1, wherein said control cabinet comprises a vacuum assembly, a vapor-compression-cooling system, an oil filter assembly, and a coolant assembly.

3. The continuous flow centrifuge system of claim 1, wherein said drive assembly further comprises:
   a rotor having a rotor shaft;
   an upper bearing plate;
   an upper bearing rotatably securing said rotor shaft in said upper bearing plate;
   a first snap ring securing said upper bearing to said rotor shaft;
   a lip seal being positioned over said upper bearing and forming a rotatable seal with said upper bearing plate;
   a second snap ring securing said lip seal to an inner diameter of said upper bearing plate;
   a stator housing having a stator therein;
   a lower bearing plate; and
   a lower bearing rotatably securing said rotor shaft in said lower bearing plate, said upper and lower bearing plates being secured to said stator housing so that said rotor is operatively aligned with said stator.

4. The continuous flow centrifuge system of claim 3, wherein said stator housing comprises an inner stator housing sealed in an outer stator housing to define a stator cooling chamber therebetween, the system further comprising a vapor-compression-cooling system configured to pump a refrigerated coolant into said stator cooling chamber.

5. The continuous flow centrifuge system of claim 3, wherein said lower bearing plate comprises a pair of ports and said stator is positioned in said inner stator housing so that a power cable and a communication cable are in electrical communication with said stator through said pair of ports, respectively.

6. The continuous flow centrifuge system of claim 3, wherein said upper bearing plate comprises an inner surface that is sloped in a direction away from said lip seal.

7. The continuous flow centrifuge system of claim 6, further comprising a fluid collection area defined in said inner surface.

8. The continuous flow centrifuge system of claim 3, further comprising an upper housing secured to said upper bearing plate to define an air chamber therebetween.

9. A continuous flow centrifuge system comprising:
a control interface;
a control cabinet housing a vacuum assembly, a vapor-compression-cooling system, an oil filter assembly, and a coolant assembly;
a lift assembly having a horizontal boom extending therefrom, the lift assembly defining a foot print thereunder;
a drive assembly; and
a centrifugation tank assembly drivingly coupled with said drive assembly, said lift assembly being configured to lift and remove said drive assembly from said centrifugation tank assembly, wherein said control cabinet is under said horizontal boom of said lift assembly and is within said foot print of said lift assembly, wherein said control interface is in operative communication with said vacuum assembly, said vapor-compression-cooling system, said oil filter assembly, said coolant assembly, said lift assembly, said drive assembly, and said centrifugation tank assembly for operation by said control interface.

10. The continuous flow centrifuge system of claim 9, wherein said drive assembly further comprises:
a rotor having a rotor shaft;
an upper bearing plate;
an upper bearing rotatably securing said rotor shaft in said upper bearing plate;
a first snap ring securing said upper bearing to said rotor shaft;
a lip seal being positioned over said upper bearing and forming a rotatable seal with said upper bearing plate;
a second snap ring securing said lip seal to an inner diameter of said upper bearing plate;
a stator housing having a stator therein;
a lower bearing plate; and
a lower bearing rotatably securing said rotor shaft in said lower bearing plate, said upper and lower bearing plates being secured to said stator housing so that said rotor is operatively aligned with said stator.

11. The continuous flow centrifuge system of claim 10, wherein said stator housing comprises an inner stator housing sealed in an outer stator housing to define a stator cooling chamber therebetween, wherein said vapor-compression-cooling system pumps a refrigerated coolant into said stator cooling chamber.

12. The continuous flow centrifuge system of claim 9, wherein said control interface is a touch screen having a plurality of control icons in communication with a controller to control one or more of said lift assembly, said drive assembly, and said centrifugation tank assembly.

13. The continuous flow centrifuge system of claim 12, further comprising a single safety sensor, said controller being configured to prevent operation of said lift assembly, said drive assembly, and said centrifugation tank assembly without contact by a user of both said single safety sensor and a respective one of said plurality of control icons.

* * * * *